Oct. 16, 1956  A. A. PAPE  2,766,526
METAL SHEARS
Filed July 23, 1954
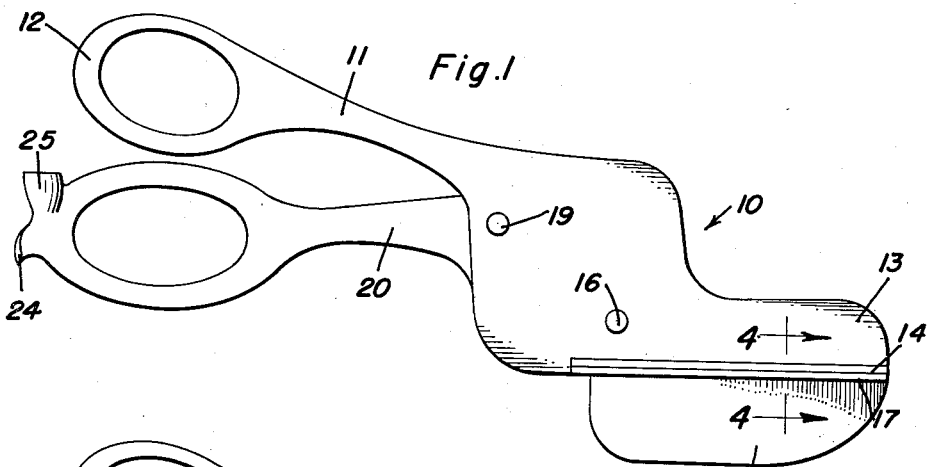
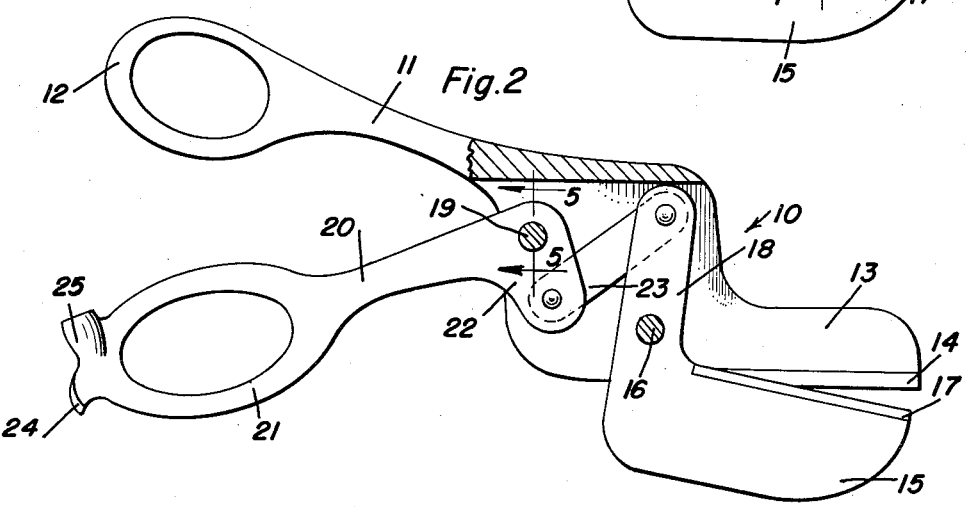
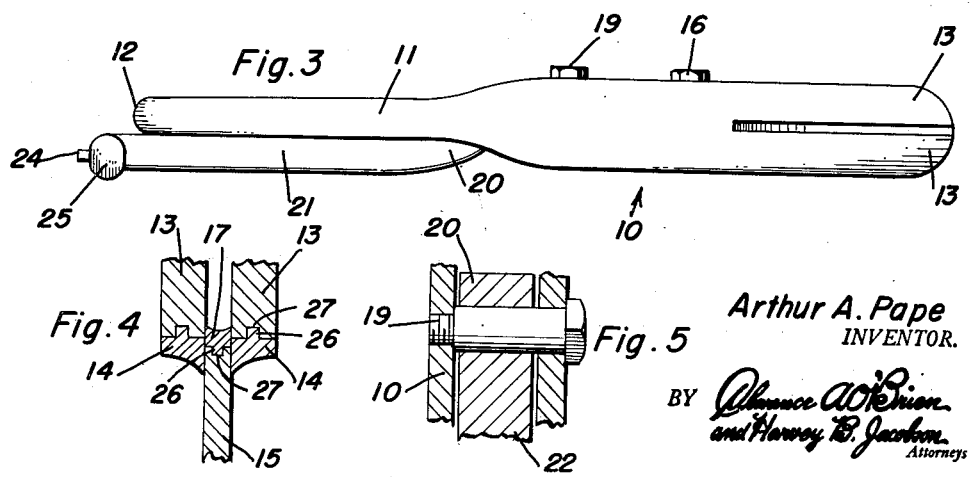
Arthur A. Pape
INVENTOR.
BY *(signatures)*
Attorneys

United States Patent Office 2,766,526
Patented Oct. 16, 1956

2,766,526

METAL SHEARS

Arthur A. Pape, Salt Lake City, Utah

Application July 23, 1954, Serial No. 445,425

1 Claim. (Cl. 30—251)

The present invention relates to new and useful improvements in shears, particularly for sheet metal air pipes or ducts and has for its primary object to provide, in a manner as hereinafter set forth, a device of this character comprising a novel construction and arrangement of blades whereby a clean cut may be expeditiously made which can be subsequently joined together without recutting or working either edge.

Other objects of the invention are to provide a sheet metal cutting tool of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing, wherein like characters of reference designate corresponding parts throughout the several views, and wherein:

Figure 1 is a view in side elevation of a tool constructed in accordance with the present invention;

Figure 2 is a view principally in longitudinal section through the device;

Figure 3 is a top plan view;

Figure 4 is a fragmentary view in transverse section, taken substantially on the line 4—4 of Figure 1; and Figure 5 is a fragmentary view in transverse section, taken substantially on the line 5—5 of Figure 2.

Referring now to the drawing in detail, it will be seen that the embodiment of the invention which has been illustrated comprises a substantially U-shaped frame 10 of suitable metal. Formed integrally with the bight portion of the frame 10 and extending upwardly and rearwardly therefrom is a stationary upper handle 11 comprising a thumb receiving eye 12. Formed integrally with the leg portions of the frame 10 and projecting forwardly therefrom is a pair of spaced, parallel stationary upper blades 13. The stationary upper blades 13 comprise replaceable cutting edges 14 of the cross-sectional shape shown to advantage in Figure 4 of the drawing, said cutting edges being beveled and hollow ground.

A swinging lower blade 15 is pivotally secured at one end, as at 16, in the lower portion of the frame 10. The swinging lower blade 15 is engageable between the stationary upper blades 13 and is cooperable therewith. Towards this end, the swinging lower blade 15 includes a replaceable cutting edge 17 which, as also shown to advantage in Figure 4 of the drawing, is hollow ground to provide a double shearing action with the elements 14. The elements 14 and 17 are preferably of Carboloy or other suitable material and comprise integral, longitudinal tongues 26 which are engaged in grooves 27 provided therefor in said elements.

Formed integrally with the pivoted end of the lower blade 15 and operable between the legs of the substantially U-shaped frame 10 is an arm 18. A threaded pin 19 (see Figure 5) traverses the upper rear portion of the frame 10 and journaled thereon is a swinging lower handle 20. The handle 20 includes a finger receiving eye 21. On the pivoted end of the lower handle 20 is an integral arm 22. A link 23 operatively connects the arm 22 to the arm 18.

Formed integrally with the finger eye 21 of the lower handle 20 is a starting point or cutter 24. Also formed integrally with the finger eye 21 is a striking head 25 for driving the cutter 24 through the work.

It is thought that the operation or use of the tool will be readily apparent from a consideration of the foregoing. When necessary, as, for instance, when an air duct is to be cut, the starting cutter 24 is driven therethrough to form an opening for the insertion of the blade 15. The blade 15 is then swung about its axis as the tool is fed to the work through the medium of the swinging handle 20. The coacting edges of the elements 14 and 17 cleanly cut a narrow strip of metal from the work, which strip curls or coils upwardly between the spaced, parallel stationary upper blades 13. It has been found in practice that the edges left are so clean-cut or smooth that they may readily be joined without further preparation.

It is believed that the many advantages of a shear implement constructed in accordance with the present invention will be readily understood and although a preferred embodiment of the device is as illustrated and described, it is to be understood that changes in the details of construction may be resorted to which will fall within the scope of the invention as claimed.

What is claimed is:

A shear implement including: a substantially inverted U-shaped metallic frame, a pair of spaced, parallel stationary blades integral with the lower portions of the legs of said frame and projecting forwardly therefrom, a rearwardly projecting handle integral with the bight portion of the frame, a swinging blade comprising an angularly upwardly extending rear end portion pivotally secured between said lower portions of said legs of said frame, said swinging blade being engageable between and cooperable with said stationary blades, all of said blades having longitudinal grooves therein and comprising removable cutting edges including longitudinal tongues engaged in the grooves, an upstanding arm integral with the pivoted end of the swinging blade, a swinging handle having one end portion pivotally secured between the upper, rear portions of the frame legs, a depending arm integral with the pivoted end portion of said swinging handle, and a link pivotally connected to the free end portions of the arms for operatively connecting the swinging handle to the swinging blade, said arms and said link being operable within the confines of the frame between the legs thereof and housed thereby.

References Cited in the file of this patent

UNITED STATES PATENTS

| | | |
|---|---|---|
| 325,291 | Warner | Sept. 1, 1885 |
| 689,846 | Beauchemin | Dec. 31, 1901 |
| 777,366 | Bergmark | Dec. 13, 1904 |
| 2,163,088 | Grant | June 20, 1939 |
| 2,375,364 | Hood | May 8, 1945 |
| 2,682,795 | Neal | July 6, 1954 |

FOREIGN PATENTS

| | | |
|---|---|---|
| 557,609 | France | May 8, 1923 |